Nov. 3, 1953  E. L. TICHENOR ET AL  2,658,162
WELDING APPARATUS
Filed Dec. 24, 1949
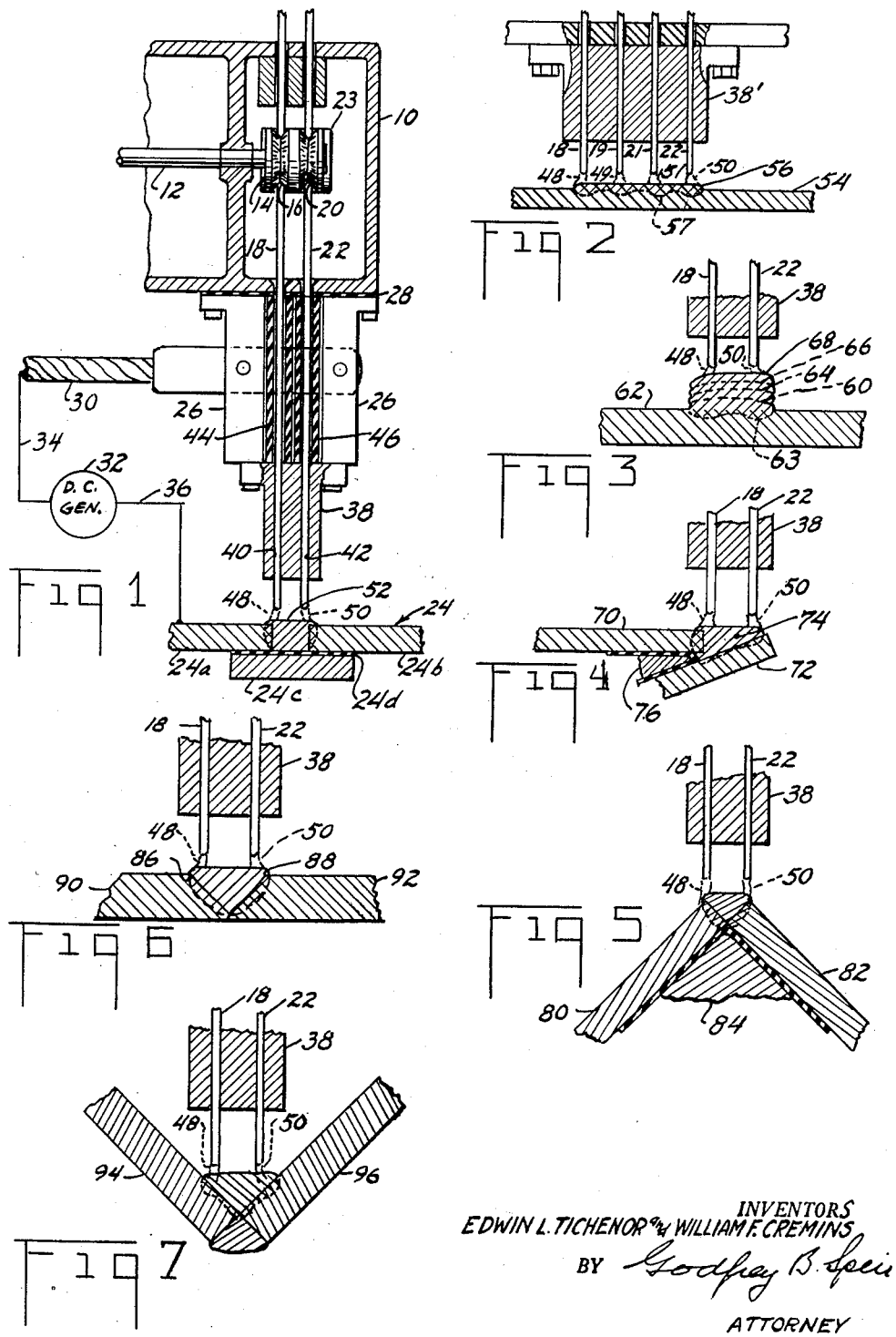
INVENTORS
EDWIN L. TICHENOR & WILLIAM F. CREMINS
BY Godfrey B. Spear
ATTORNEY Patented Nov. 3, 1953

2,658,162

UNITED STATES PATENT OFFICE 2,658,162

WELDING APPARATUS

Edwin L. Tichenor, Clifton, and William F. Cremins, Montclair, N. J., assignors to Curtiss-Wright Corporation, a corporation of Delaware Application December 24, 1949, Serial No. 134,908

1 Claim. (Cl. 314—36)

This invention relates to improved methods for automatic arc welding and to the provision of special apparatus to accomplish the methods.

In general, the invention concerns itself with the type of welding wherein welding rod is automatically fed by a driving mechanism through a contractor shoe toward the weld zone, the welding head moving over a prepared workpiece. Electrical power is supplied to the welding head shoe so that it may be transferred to the welding rod, there being an arc between the end of the welding rod and the workpiece which melts the welding rod, heats up the material of the weld preparation, and deposits metal on the weld preparation. Apparatus of this sort as above noted is well known in the art. Our improvements in brief consist in feeding two or more rods in parallel, through the same welding head if that is convenient, and in supplying the several rods with power from the same power source. In passing the welding head over the workpiece, an arc is struck between each welding rod and the workpiece, the rods passing over the workpiece in side by side or abreast relationship so that a plurality of weld metal deposits are made simultaneously. The welding rods are spaced from one another a relatively short distance, as presently contemplated from one-fourth inch to one inch though such spacing is not limiting, depending upon the welding current density and the size of the welding rod, to the end that a pool of welding metal is formed not only beneath each welding rod but also between them, the weld metal flowing across the workpiece between the two welding rods and depositing itself upon the workpiece. Heat penetration and melting of the parent metal, effected by the welding arcs, is somewhat deeper directly beneath the welding rods but heat still penetrates the workpiece between the rods to melt the parent metal so that a complete and effective bond of weld metal is attained throughout the weld width.

In prior practice, it has been conventional to utilize a single welding rod of appropriate diameter, feeding said rod to the work and energizing the arc with a current and voltage appropriate to secure the desired degree of weld metal deposit and heat penetration into the workpieces so a good bond between the workpieces and the metal may be secured. Where wide gaps are to be filled with weld metal, the single arc from the single welding rod necessarily lies between the end of the welding rod and the nearest of several nearby portions of the workpiece so that a weld may pile up to one side or the other of the weld preparation with a non-uniform weld bead resulting from the operation. The cause of these defects is sometimes called "arc blow," and is apparently due to instability of the arc and/or faulty weld preparation. Also, in conventional single rod welding technique, if it is desired to build up material on a workpiece, a succession of beads are laid upon the workpiece, the beads overlapping and eventually building up the desired amount of metal. However, these successive beads cool off, and when the next bead is laid upon prior beads, the heat in welding the new bead penetrates the old to form a good bond but the configuration of the successive beads leaves considerable excess metal, increasing the weight or increasing the amount of machining which must subsequently be accomplished.

In the practice of our technique, a broad uniform weld bead may be laid upon a workpiece or weld preparation since the weld metal from the two arcs flows therebetween, laying out in substantially flat fashion so that the resulting built-up bead is much broader than those obtainable heretofore, leaving only a very small amount of excess material for subsequent machining, and bonding to the workpiece with a minimum but optimum of weld penetration into the parent metal. In the prior single rod technique if considerable metal was to be laid upon a workpiece, high current densities were required to melt the material and unnecessarily deep weld penetration was caused in the parent metal, disturbing the grain structure of the metal and weakening it.

Our invention may be applied in many different ways; the attached drawings show a few of the applications of our technique along with an exemplary arrangement of multiple welding rods being fed to the same weld zone. These embodiments are not to be construed as limiting the scope of the invention, the latter only being limited by the appended claims.

In the drawings Fig. 1 is a more or less schematic sectional view of a welding head embodying a desirable form of the invention, which as shown consists of a pair of welding rods applied to one arrangement of a weld preparation;

Fig. 2 shows a portion of a welding head embodying multiple welding rods, building up a broad flat bead on a plate;

Fig. 3 shows multiple welding rods utilized for the purpose of building up a very thick broad bead on a weld preparation;

Fig. 4 shows the application of our invention to the welding of two angularly disposed plates which comprise a weld preparation;

Fig. 5 shows the application of our invention to an exterior corner weld;

Fig. 6 shows the use of our invention in welding together two prepared plates; and Fig. 7 shows the use of our invention in effecting an inside corner weld.

Referring first to Fig. 1, we show a welding head 10 which includes a rod feed shaft 12 carrying a grooved feed roll 14 having a groove 16 for the first weld rod 18 and a groove 20, spaced from groove 16, to feed a second weld rod 22. The rods 18 and 22 are fed to the top of the head 10 from appropriate feed reels and are held against the roll 14 by a pressure roll 23. Ordinarily the head 10 is carried on a movable mounting so that it may be passed in one or more directions in a horizontal plane over a workpiece 24. Secured to the bottom of the welding head 10 is an adapter 26, insulated at 28 from the head, to which a power cable 30 is secured, the cable being fed with welding power from a D. C. generator 32 or other power source through a lead 34, the other lead 36 of the generator being grounded to the workpiece 24. To the lower end of the adapter 26 is secured a power transfer nozzle or welding rod guide 38 provided with holes 40 and 42 through which the respective weld rods 18 and 22 pass. The size of the holes 40 and 42 is such as to provide a close running fit with the weld rods, and welding power transfer to the rods is afforded through the guide 38 alone, since other portions of the weld rods are in insulated relation to the welding head. To assist in maintaining this insulated relationship, the weld rods 18 and 22 may be passed through nonconducting tubes of porcelain or the like indicated at 44 and 46 which bridge the distance from the bottom of the welding head 10 to the top of the weld rod guide 38.

The rods 18 and 22 issue from the bottom of the guide 38 which is spaced above the workpiece 24. In operation, arcs 48 and 50 are struck between the respective weld rods and the workpiece, these arcs tending to diverge from one another or to "blow" away from each other due to the fact that magnetic repulsion exists therebetween since the weld rods are both of the same magnetic polarity, being fed from a common current supply. This "blow" holds the arcs in a steady, diverging position in space and renders them very stable.

The weld preparation shown in Fig. 1 comprises two spaced apart plates 24a and 24b beneath which is a back-up plate 24c and a back-up insulation 24d of fibreglass tape, flux or the like. As the weld proceeds, the arc 48 is made between the weld rod 18 and the corner of the plate 24a while the arc 50 is made between the corner of the plate 24b and the weld rod 22. The two arcs break down the respective corners of the plates, melting them, while weld metal from the rods feeds into the groove between the plates, commingling with the molten metal of the parent plates and forming between them a pool of molten weld metal which builds up to fill the entire space between the plates and to form a bead 52 therebetween. A joint of the type shown in Fig. 1 may be made in one or several passes of the welding head over the work, the advisability of the number of passes being dictated by the amount of weld metal to be deposited, the thickness of the workpieces, and the feed, current density and other characteristics which are deemed appropriate.

Reference may now be made to Fig. 2 which shows a weld rod guide 38' adapted to receive four welding rods 18, 19, 21 and 22 arranged in side by side relation and adapted to travel abreast at the same rate of rod feed over a workpiece. All four rods are furnished with welding power simultaneously through the same transfer guide 38' and four arcs indicated at 48, 49, 50 and 51 are formed between respective rods and the workpiece 54, here shown as a flat plate upon which it is desired to build up a broad bead. The bead is shown at 56 and it will be noted that each of the four arcs will effect a somewhat deeper high temperature weld penetration immediately therebeneath, than between the arcs, in the parent metal the line of demarcation being noted at 57. However, sufficient weld penetration is obtained between the arcs as well as directly under them to provide a complete fused bond between the applied weld metal and the workpiece 54. As weld metal is deposited, it flows freely between the several electrodes to form a substantially flat bead, built up on the workpiece 54, the bead portion 56 shown as being double cross-hatched representing an admixture of weld metal and parent metal from the workpiece 54. It is clear from this figure that a large amount of weld metal may be deposited simultaneously, in a single pass, said metal being distributed over a large area of the workpiece. If the same weld were to be made in a single pass, a much heavier bead than might be desired would be deposited and also, the current density which would be needed would cause an unnecessarily deep penetration of fused metal into the parent metal. It would be impossible to secure the uniform relatively flat top on the bead 56 if a succession of passes were to be made with a single weld rod set up for the amount of current which each of the multiple weld rods receives in the arrangement of Fig. 2.

It may here be noted that the several arcs in the multiple weld of this invention are self-compensating since the several rods are fed simultaneously. If there be an instantaneous unbalance of current density between the several rods, less metal would be deposited from the rod having the lower current density. Thus the end of the rod would approach the workpiece more closely, increasing the intensity of the local arc and thereby burning off the weld rod at high current density until it is equal with the rest whereupon uniform arcs between the several weld rods are resumed. This phenomenon would not occur, necessarily, if each of the several weld rods were individually fed by a separate feed system and were individually controlled by separate welding controls or provided with power from separate generators.

Reference may now be made to Fig. 3 wherein double weld rods are used, feeding from a common guide 38. The intended weld in this figure is a thick build-up on a plate or workpiece wherein a succession of passes are made over the same path. In the first pass of the welding head a bead 60 is deposited on the workpiece 62, this bead having deeper penetration directly beneath the weld rods and shallower penetration therebetween, the deposited metal flowing between the two electrodes forming a relatively flat shallow bead on the workpiece. The second pass over the bear 60 builds the weld up to the level 64 and a third pass and a fourth pass respectively build the bead up to the levels 66 and 68. The levels 60, 64, 66 and 68 are intended to represent progressive outer surfaces of the weld beads, rather than the heat penetration within the portions already formed. It is a phenomenon in a practice of this technique that the outer profiles 60—68 are substantially parallel to one another regardless of how many passes may be made to build up the bead. It is a further phenomenon in the practice of this technique that the successive beads will lie upon one another with no overflow, the sides of the aggregate final bead being substantially normal to the workpiece 62 with only slight irregularities therealong which may be readily machined off. Macro-etching of a section of the bead of Fig. 3 shows completely homogeneous weld metal in the build-up bead and a demarcation only between the parent plate 62 and the bottom of the first bead as at 63 which reveals the amount of weld penetration in the parent material. By this technique, high flanges may be built up on components of all sorts. Also, using the techniques of Figs. 2 or 3, broad build-ups may be obtained by running a succession of slightly overlapping beads in side-by-side relation.

Fig. 4 shows our welding technique applied to the welding of overlapped, acutely angled plates 70 and 72 wherein it is desired to fill in the exterior groove formed between the plates as by a weld bead 74. Where complete penetration in both plates is desired, it is preferable to space the end of the plate 70 from the surface of the plate 72 and to provide a backing-up bar 76 of copper or the like, faced with flux or fibreglass. In making the welding pass, the electrode 18 is directed toward the corner of the plate 70 and the electrode 22 is directed toward the corner of the plate 72. As welding proceeds, heat penetration from the arc 48 melts the corner of the plate 70 and deposits weld metal therealong while heat penetration from the arc 50 causes weld penetration at the corner of the plate 72 as indicated by the dotted line. The weld metal deposited by both rods bonds to the two plates and flows between the welding rods to form the homogeneous bead 74 which may either be built up by several passes or may be formed in a single pass if the welding speed, rod feed, current density and voltage are properly adjusted.

The kinds of welds shown in Figs. 3 and 4 are particularly useful in the fabrication of hollow steel aircraft propeller blades, but are not limited thereto.

Fig. 5 shows a corner weld carried out with a double welding rod arrangement wherein the arcs 48 and 50 are directed toward the corners of plates 80 and 82. Here, as in the arrangement of Fig. 4, each arc causes weld penetration in its respective plate, the weld metal being deposited between the two arcs and building up a homogeneous bead completely bonded to the facing edges of the plates 80 and 82. Depending upon the depth of weld desired, sufficiently low feed may be used and sufficiently high current density to form a complete joint between the two members whereupon it will be desirable to back-up the corner between the plates with a member 85 faced with flux or fibreglass, or with a fluxing core known in the prior art.

Fig. 6 shows an arrangement for joining two plates in abutting relation, the plates having been chamfered to form a groove therebetween which is to be filled with weld metal. Here, the electrodes 18 and 22 are adapted to lie opposite the corners 86 and 88 respectively of the prepared plate members 90 and 92. Since the plates 90 and 92 abut at their bottom edges, no weld back-up is needed and it is presumed here that the weld penetration is not desired for the full depth of the plates. The welding takes place as previously described, the arcs 48 and 50 working respectively with the plate corners 86 and 88, the weld metal from the rods depositing in the groove between the plates and bonding to the chamfered edges of the plates, the upper bead being substantially flat between the arcs due to the interflow of molten weld metal as the weld metal accumulates.

Fig. 7 shows our technique applied to the welding of an inside corner joint wherein rods 18 and 22 are directed one each toward plates 94 and 96 comprising the weld preparation. In a manner similar to that described above, the two arcs 48 and 50 cause heat penetration in the respective plates and the deposit of metal thereupon, the molten metal deposited flowing between the plates and between the arcs and bonding to the plates so that the resultant weld bead is a uniform flat formation characterized by freedom from the ripple which usually occurs on a weld bead formed with a single weld rod.

The techniques of this invention are particularly useful in the welding of thin sheet metal since current densities can be maintained at a low level commensurate with the shallow weld penetration requirements of the thin sheet metal, while a generous amount of weld metal may be deposited, completely joining the edges of the thin metal plates and providing an effective bead therebetween.

Only a few kinds of weld preparations have been shown in the drawings and many more applications for the welding technique herein described will readily occur to those skilled in the art. Most of the figures show the use of a dual weld rod arrangement but multiple rods using three, four or more rods are wholly within the scope of the invention, an example of four rods having been shown in Fig. 2.

A further phenomenon which appears to take place in the practice of our multiple-rod welding technique for welding two pieces is that the focal points of high temperature from the two arcs have optimum location—that is, at or near the surfaces of the parent metal of the workpieces. The arc heat thus blends weld metal and parent metal, while molten weld metal flows between the two arcs at a less-than-arc temperature. Upon cooling, heat being conducted away from the weld zone through the parent metal, the high temperature portions adjacent the faces of the parent metal are cooled first, after which heat from the pool of weld metal dissipates through the bond faces and to the atmosphere. The pool of weld metal or, only one face of the workpiece edges, are not excessively heated as in usual single electrode practice in order to bring one or both faces of the parent metal up to the temperature needed for good bonding. Accordingly, the use of our technique produces sounder welds less likely to have incipient flaws upon cooling.

It can be appreciated in setting up a weld preparation for two pieces, that the thermal bond between the two pieces of the weld preparation is rather poor, and that a single arc is inevitably going to pass between the rod and only one point of one of the workpieces, leaving the other workpiece cool until it is heated by deposited weld metal. A high enough temperature must be developed and sustained at the point of arcing to bring other parts of the desired weld up to temperature, with the possibility that the metal at the arc zone is much hotter than necessary. In using our technique, both pieces of parent metal are positively heated, removing one of the deficiencies of the customary technique and producing sounder and faster welds, and reducing the need for high precision fitting in the weld preparation.

Though several embodiments illustrating the invention have been shown and described, it is to be understood that the invention may be applied in other and various forms. Changes may be made in the arrangements, without departing from the spirit of the invention. Reference should be had to the appended claims for definitions of the limits of the invention.

What is claimed is:

An automatic electric welding setup comprising in combination a welding head having a welding rod feedroll including annular grooves of the same diameter spaced between one-fourth inch and one inch apart, means to drive said feedroll rotationally to feed welding rods engaged with the roll in said grooves in unison, a unitary welding rod guide and nozzle member of electrically conductive material, means to secure said member to said head in electrically insulated relation thereto and in spaced relation from the head and feedroll, an insulating guide sleeve for and embracing each weld rod disposed between said feedroll and said member and secured in place by said securing means, said member including parallel guide holes alined with said guide sleeves, spaced apart by a distance of one-fourth inch to one inch, weld rods engaging said roll at said grooves, passing through said sleeves and passing through said guide holes in said member, said rods have fitting engagement with and contacting the member to enable welding current transfer from the member to said rods, and conductor means firmly connected to said member to carry welding power to said member and to both of said rods simultaneously, as both of said rods are fed from said feedroll through said guides and through said member.

EDWIN L. TICHENOR.
WILLIAM F. CREMINS.

References Cited in the file of this patent

UNITED STATES PATENTS

| Number | Name | Date |
|---|---|---|
| 1,340,056 | Kenyon | May 11, 1920 |
| 1,371,094 | Holslag | Mar. 8, 1921 |
| 2,083,309 | Applegate | June 8, 1937 |
| 2,151,915 | Hopkins | Mar. 28, 1939 |
| 2,226,403 | Hopkins | Dec. 24, 1940 |
| 2,241,572 | Armstrong | May 13, 1941 |
| 2,299,747 | Harter | Oct. 27, 1942 |
| 2,536,294 | Landis et al. | Jan. 2, 1951 |

FOREIGN PATENTS

| Number | Country | Date |
|---|---|---|
| 609,848 | Germany | Feb. 26, 1935 |